United States Patent Office 3,788,948
Patented Jan. 29, 1974

3,788,948
METHOD OF BINDING, BY COVALENT BONDS, PROTEINS AND POLYPEPTIDES TO POLYMERS USING CYANATES

Sven Lennart Kagedal and Stig Hjalmar Johannes Akerstrom, Uppsala, Sweden, assignors to Pharmacia AB, Uppsala, Sweden
No Drawing. Continuation-in-part of abandoned application Ser. No. 783,761, Dec. 13, 1968. This application Oct. 12, 1971, Ser. No. 188,575
Claims priority, application Sweden, Dec. 20, 1967, 17,469/67
Int. Cl. C07g 7/00, 7/02
U.S. Cl. 195—68
12 Claims

ABSTRACT OF THE DISCLOSURE

Organic cyanate compounds are employed for binding organic compounds containing a primary or secondary amino group to polymers containing one or more hydroxyl and/or primary and/or secondary amino groups. The invention is useful, among other things, for binding water soluble enzymes to water insoluble polymers while preserving the activity of the enzyme.

---

This is a continuation-in-part of Ser. No. 783,761, filed Dec. 13, 1968, and now abandoned.

The present invention is concerned with a method for binding, by covalent bonds, a polymer containing at least one group of the formula —XH, wherein —XH represents a member selected from the group consisting of hydroxyl groups, primary and secondary amino groups, and an organic compound containing at least one group of the formula —YH, wherein —YH represents a member selected from the group consisting of primary and secondary amino groups in which the polymer is reacted with a compound capable of forming a reactive derivative thereof, whereupon the derivative as formed is reacted with the organic compound.

Such a process is previously known. Organic compounds containing one or more groups of the formula —YH, that it is of special interest to bind to polymers, are particularly proteins, polypeptides, peptides, and amino acids and derivatives thereof. Examples of such compounds are enzymes, antibodies, protein and/or peptide hormones, antigenic proteins, allergens or haptens. An important example is antibodies which, for analytical determination, can be bound specifically to polymers by such a process. Other examples of such organic compounds are derivatives of carbohydrates, for example, polysaccharides containing an amino group of the formula —YH. Examples of polymers containing one or more groups of the formula —XH are polysaccharides such as dextran, cellulose, starch, dextrin and agar-agar (Sepharose®), copolymers of dextran with epichlorohydrin or derivatives of these compounds such as hydroxyethyl cellulose and 2-hydroxy-3-(4-amino-phenoxy)-propyl-substituted copolymers of dextran with epichlorohydrin. The polymer may also be polyaminostyrene.

Examples of compounds capable of forming a reactive derivative of the polymer as set forth above according to the prior are are agents for introducing azide groups, isocyanate groups, and diazonium groups. The preparation of the reactive derivative is often complicated and the results are difficult to reproduce. It is also known to introduce reactive groups in a polymer containing one or more groups of the formula —XH by treating said polymer with cyanogen bromide. The latter compound is, however, very toxic, which represents a disadvantage when working on a technical scale.

Although the cyanogen bromide yields a reactive derivative, which presents excellent properties from several viewpoints, it must be held a disadvantage that it is difficult to vary the reactivity of the derivative by this method in view of what is desired in each special case.

It has now been found possible to avoid or essentially reduce the disadvantages above referred to. To this effect there is used an organic cyanate compound containing one or more cyanate groups as a compound capable of forming a reactive derivative of the polymer.

Preferred compounds are those of the formula $$R(OCN)_x$$

in which R is an organic residue, for example, a halogenated alkyl group, a substituted aromatic group, a heterocyclic ring system or a cycloaliphatic group and $x$ is the integer 1 or 2, preferably 1. Substituents in the aromatic groups are, for example, nitro, halogen such as chloro, alkyl such as methyl and tert.butyl, alkoxy such as methoxy.

The compound used according to the invention, which contains at least one cyanate group, can be of very different nature. Thus, it may be an aliphatic, alicyclic-aromatic or heterocyclic cyanate compound, substituted or unsubstituted. Examples of such compounds are $\beta,\beta,\beta$-trichloroethylcyanate, 1-adamantylcyanate, phenylcyanate, o-nitrophenylcyanate, p-nitrophenylcyanate, m-chlorophenylcyanate, p - methoxyphenylcyanate, o-tert. butylphenylcyanate, 2,2-dimethylphenylcyanate, 2,4,6-tritert.butylphenylcyanate, 2 - naphthylcyanate, 1,4-dicyanatobenzene.

As mentioned above the coupling process thus comprises two distinct steps. The first one of these, the preparation of the reactive derivative, is usually carried out in such a manner that the polymer containing one or more groups of the formula —XH is contacted with the organic cyanate compound in question. The reaction is carried out in an alkaline medium, for example in an aqueous alkaline medium. Most suitable pH-values are primarily those which lie between 7 and 13. The reaction can also be carried out in other solvents than water, such as those which are miscible with water, e.g. acetone and dioxane. Compounds which may suitable be used to adjust the desired pH-value or pH-interval may be sodium hydroxide, calcium hydroxide, sodium hydrogen carbonate, sodium carbonate, potassium carbonate, triethylamine.

It is relatively simple for a person skilled in the art to find the suitable pH-value or pH-interval because the pH is selected inter alia according to reaction temperature and reaction time. The reaction can thus be carried out at different temperatures such as in the range of from 0 to 50° C. and the reaction time can vary within broad limits, from a few minutes to hours. The formed reactive derivative of the polymer is suitably subjected to purification before being bound to the organic compound, for example by washing with suitable solvents, such as water and acetone. The second step of the invention, i.e. binding the reactive derivative to the organic compound, containing one or more groups of the formula —YH, is preferably carried out in a weakly alkaline solution at a temperature which most frequently lies between 0 and 50° C., such as room temperature. This reaction step can advantageously be carried out in aqueous solution.

A further very essential advantage attained by using an organic cyanate compound as an agent for introducing the reactive groups is that it will be possible to bind to the polymer also very sensitive compounds without the latter undergoing any undesired change. By reacting the polymer containing one or more groups of the formula —XH with different organic cyanate compounds there are obtained very reactive intermediate compounds which schematically can be written as follows

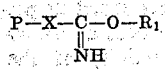

$$P-X-\underset{\underset{NH}{\|}}{C}-O-R_1$$

wherein X has the above significance and $R_1$ is the residue of the organic cyanate. These intermediate compounds react readily under mild conditions of reaction, with an amino group of the organic compound containing at least one group of the formula —YH. Thus, it is, for example, possible to bind an antibody to the above polymer without losing the ability of the antibody to bind its antigen.

The polymer containing one or more groups of the formula —XH is preferably insoluble in water. An example of such polymers is a copolymer of dextran and epichlorohydrin (Sephadex ®). This polymer is characterized by a varying water regain and varying grain sizes. For binding, for example, antibodies to the copolymer of dextran there can be used a quality consisting of small grains, preferably having sizes in the range of from 1 to 10 μm. Other examples of such water-insoluble polymers are cellulose, agarose, water-insoluble proteins such as keratin, and water-insoluble synthetic polymers containing hydroxyl groups or primary amino groups or secondary amino groups.

The polymer may, however, also be water-soluble. Examples of such polymers containing one or more groups of the formula —XH are water-soluble polysacharides, such as dextran, starch and inulin, and synthetic polymers such as polyvinylalcohol.

From the examples below is evident that the type of substituent that is contained in the organic cyanate compound may be varied. The substituent of the organic cyanate may thus be capable of donating or attracting electrons or capable of causing a certain form of steric hindrance on the cyanate group, and neither is the position of the substituent in relation to the cyanate group essential. However, the activation of the polymer to obtain optimal activation may take place at different pH-values and temperatures, which may readily be determined by the person skilled in the art for each specific cyanate compound.

The invention will now be illustrated further in the form of some examples.

EXAMPLE 1

(A) Preparation of the Reactive Derivative

General process 1 g. of the polymer (i.e. cross-linked dextran, agargel of agar-agar, cellulose) is agitated in 40 ml. of distilled water for 3 minutes, whereupon 2 g. of the compound containing at least one cyanate group are added. The pH-value is adjusted to and maintained at pH 10.7 by automatic addition of an aqueous 2 M solution of sodium hydroxide. The reaction is continued for 6 minutes, whereupon the reaction product is filtered off and washed carefully with water, acetone and water, and then shrunk with acetone and dried.

It is possible to permit the preparation of the reactive derivative to take place at other pH-values and by using other activation times (Table 5). These deviations in the general method of preparation are set forth below.

(B) Binding a Reactive Derivative to Organic Compounds Containing One or More Groups of the Formula —YH (1) Binding antibodies against insulin to particles of cross-linked dextran, agar-agar and cellulose 100 mg. of the reactive derivative are swollen in 400 μl. of sodiumcarbonate-sodiumbicarbonate buffer (pH 9.2) for 10 minutes. 100 μl. of the solution of the antibody in the same buffer as above are added to the reactive derivative in a test tube and shaken at +4° C. for 2–3 days. A few ml. of 0.1 M $NaHCO_3$-solution are added whereupon the sample is centrifuged and the clear solution sucked off. The solid residue is washed with 0.1 M $NaHCO_3$; 0.5 M HAc buffer (pH 4.5) and finally with the buffer, which will later on be used for the analysis to be carried out (Tables 1–4).

(2) Binding cystein, glycylleucin and glycyltyrosin to the reactive derivative of cross-linked dextran 0.20 g. of the reactive derivative of cross-linked dextran and 0.08 g. of cystein, glycylleucin or glycyltyrosin is agitated in 1 ml. of a $Na_2CO_3$—$NaHCO_3$ buffer (pH 9.2) for two days at 4° C. The product is filtered off and washed with 0.5 M $NaHCO_3$ and 0.01 M HCl and 1 M NaCl and finally with water. The washed product is shrunk with acetone and dried.

ANALYSES (1) The content of cystein bound to cross-linked dextran is 6%.
(2) The content of glycylleucin bound to cross-linked dextran is 13%.
(3) The content of glycyltyrosin bound to cross-linked dextran is 12%.

The tables below are taken from different experiments, in which the properties of different types of cross-linked dextran activated by different organic cyanates are compared mutually. The results in the different tables are not comparable with each other. Under c.p.m. is stated the number of counts per minute of $^{125}I$-insulin absorbed by 0.1 mg. of a complex between antibodies and activated cross-linked dextran.

TABLE 1

| Cyanate: | C.p.m. |
|---|---|
| Phenylcyanate | 9200 |
| p-Nitrophenylcyanate | 9300 |
| o-Nitrophenylcyanate | 4600 |
| m-Chlorophenylcyanate | 1400 |

TABLE 2

| Cyanate: | C.p.m. |
|---|---|
| Phenylcyanate | 2600 |
| p-Methoxyphenylcyanate | 2240 |
| 2,4-dichlorophenylcyanate | 540 |
| 2-tert.butylphenylcyanate | 2040 |
| 2,6-dimethylphenylcyanate | 1100 |
| 1-adamantylcyanate | 580 |

TABLE 3

| Cyanate: | C.p.m. |
|---|---|
| β,β,β-Trichloroethylcyanate | 34,000 |
| 2,4,6-Tritert.butylphenylcyanate | 18,000 |

TABLE 4

| Cyanate: | C.p.m. |
|---|---|
| 1-naphthylcyanate | 1200 |
| 1,4-phenylendicyanate | 600 |
| Phenylcyanate | 1250 |

TABLE 5

| Cyanate | pH | Activation time, min. | C.p.m. |
|---|---|---|---|
| Phenylcyanate | 10.7 | 1.5 | 112,000 |
| Do | 10.7 | 6 | 93,000 |
| Do | 8 | 6 | 44,000 |
| Do | 7 | 6 | 4,000 |
| Do | 4 | 6 | 7,000 |

TABLE 6

| Cyanate | Polymer | C.p.m. |
|---|---|---|
| Phenylcyanate | Cross-linked dextran (Sephadex®) | 9,200 |
| Do | Cellulose | 9,000 |
| Do | Agar-agar (Sepharos)® | 9,100 |

(3) Binding antibodies against insulin to particles of cross-linked dextran

The procedure given in par. B.1 was used but with the following modification.

The solution of the antibody was added to the reactive derivative in a test-tube and shaken at +23° C. for 1, 2, 4, 6 and 24 hours, respectively. The results are given in Table 7.

TABLE 7

| Cyanate | Reaction time | C.p.m. |
|---|---|---|
| Phenylcyanate | 1 | 4,500 |
| Do | 2 | 4,700 |
| Do | 4 | 4,800 |
| Do | 6 | 4,800 |
| Do | 24 | 4,800 |

Except 1-adamantylcyanate and o-nitrophenylcyanate all tested cyanate compounds are known by literature (see Grigat, E., and Pütter, R., Angew. Chem. 79, 219 (1967)). 1-adamantylcyanate has been prepared according to a method known per se (see Kauer, J. C., and Hendersson, W. W., J. Am. Chem. Soc. 86, 4732, 1964) and o-nitrophenylcyanate by a method also known per se (see Grigat, E. and Pütter, R., Chem. Ber. 97, 3018 (1964)).

1-adamantylcyanate

A 50 percent suspension of sodium hydride (5 g.) in oil was washed twice with dried benzene which was then decanted off. The sodium hydride was then dispersed in dried benzene (75 ml.) and 1-adamantanol (15.3 g.) was added. The mixture was refluxed for 4 hours with agitation and was then cooled to room temperature. Cyanogen bromide (10.5 g.) dissolved in dried benzene (25 ml.) was added in a dropwise manner during about 15 minutes. After agitation for another 10 minutes the precipitate was filtered off and washed with dried benzene. The filtrate and washing liquid were combined and concentrated to dryness. 10 g. of the residue were dissolved in 25 ml. of boiling benzene and the solution was left to stand at −20° C. overnight. The resulting precipitate was filtered off and the filtrate was concentrated to dryness. The residue obtained thereby was used as an activating agent.

o-Nitrophenylcyanate o-Nitrophenol (13.9 g.) and cyanogen bromide (11.1 g.) were dissolved in acetone (30 ml.). Triethylamine (10.1 g.) was added in a dropwise manner with ice cooling at such a rate that the temperature did not exceed 10° C. The agitation was continued for 5 minutes after terminated addition. The reaction mixture was filtered after which the filtrate was poured out in ice water. The product was filtered off and dried in a desiccator over phosphorus pentoxide. The yield was 14.2 g. (87%). This raw product was used as an activating agent.

EXAMPLE 2

Activation of Dextran With p-Methoxyphenylcyanate and Coupling With Glycine

Dextran having an average molecular weight of 40,000 (5 g.) is dissolved in water (500 g.) and two portions (1 g.) of p-methoxyphenylcyanate are added with an interval of 1 hour. pH is maintained constant at 10.7 by automatic addition of 2 M NaOH. After adding the second portion of p-methoxyphenylcyanate the agitation is continued for totally 190 minutes. The reaction mixture is filtered and the filtrate is extracted three times with methylene chloride. Glycine (10 g.) is added and pH is adjusted to 9.2 with sodium carbonate (4 g.). After agitation over the night the solution is neutralized with concentrated hydrochloric acid and dialyzed for 5 days, whereupon the solution is lyophilized. The yield is 4.9 g. The content of glycine was estimated to 370 μmol per g. of product.

EXAMPLE 3

Activation of Dextran with 2,2,2-Trichloroethylcyanate and Coupling With Glycine Dextran having an average molecular weight of 40,000 (5 g.) is dissolved in water (500 ml.). pH is maintained constant at 10.7 by automatic addition of 2 M NaOH. 2,2,2-trichloroethylcyanate (1 g.) is added and after agitation for 2 hours there is added another 1 g. After another hour the last portion (1 g.) of 2,2,2-trichloroethylcyanate is added. After a total time of activation amounting to 5 hours, the mixture is filtered, glycine (10 g.) is added to the filtrate and pH is adjusted to 9.2 with $Na_2CO_3$. After storing the solution for 24 hours, it is neutralized with concentrated hydrochloric acid, dialyzed for 4 days and lyophilized. There are obtained 4.5 g. The content of glycine is estimated to 288 μmol per g. of product.

EXAMPLE 4

Binding of Antibodies Against Immunoglobuline IgE to Polyacrylamide Polymer Substituted by Aromatic Amino Groups and to Keratin (A) Activation of polymer by reacting with phenyl cyanate (1) Cross-linked polyacrylamide polymer substituted by p-aminophenyl groups, the major structural features of which polymer are evident from the following formula, was used (Enzacryl®), a product marketed by the United Kingdom company Koch-Light Laboratories, Ltd., Calmbrook, Buckinghamshire.

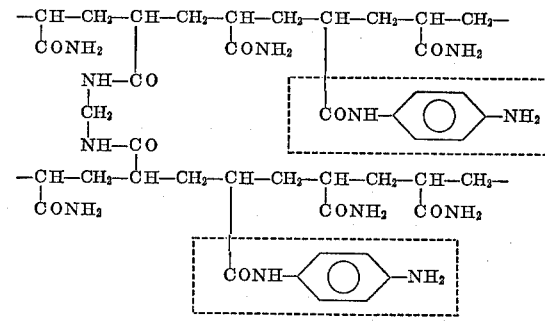

In order to activate the polyacrylamide polymer, 50 mg. thereof were agitated in 10 ml. of distilled water for 3 min., whereupon 100 mg. of phenylcyanate were added. The activation process was effected at pH 10.7 by automatic addition of an aqueous 2 M NaOH solution for 6 min. at room temperature. The activated gel was washed on a glass filter with suction, first with water, then acetone, and again with water. The product was shrunk in acetone and dried in vacuum at 20° C.

(2) 1 g. of defatted sheep's wool (keratin) in 40 ml. of distilled water was agitated for 3 min., whereupon 1 g. of phenylcyanate was added. The pH value was adjusted to and maintained at 10.7 by automatic addition of an aqueous 2 M solution of sodium hydroxide. The reaction was continued for 6 min., whereupon the reaction product was filtered off and washed carefully with water, acetone and then shrunk with acetone and dried in vacuum at 20° C.

(B) Binding of antibodies against immunoglobulin IgE (anti-IgE) to the polymer (1) To 25 mg. of activated polyacrylamide polymer in 4 ml. of 0.1 M sodium bicarbonate solution was added 50 μl. of a solution of anti-IgE, containing 10 mg./ml. The reaction mixture was agitated overnight and the particles were first washed with 0.5 M NaHCO$_3$ twice for 2×30 min., then reacted with 0.5-M ethanolamine in 0.1 M NaHCO$_3$ for 3 hours. The particles were washed twice with 0.5 M NaHCO$_3$ and then with 0.1 M NaAc for 2 min. and thereafter with 0.1 M NaAc for 30 min. The particles were suspended in a buffer containing 0.05 M phosphate buffer of pH 4, 0.9% NaCl, 0.3% human serum albumin, 0.05% Tween 20 and 0.01% NaN$_3$ (incubation-buffer).

0.5 ml. of the above suspension, containing 0.5 mg. particles per ml., was mixed with 50 μl. of an IgE solution containing 400 U (British Research Standard 68/341) IgE per ml. and agitated for 3 hours. The sample was washed with the incubation buffer, and a solution of 100 μl. of I$^{125}$ anti-IgE was added, containing 3 ng. per 100 μl. The reaction mixture was agitated overnight and the sample washed with 0.9% NaCl and 0.05% Tween 20, and the bound radioactivity was determined using a γ-counter (Table 8).

(2) 0.5 g. of activated sheep's wool (keratin) was mixed with 0.1 ml. of a solution of anti-IgE, containing 10 mg./ml. in 40 ml. of 0.1 M NaHCO$_3$ solution. The reaction mixture was agitated overnight and the particles first washed with a 0.5 M NaHCO$_3$ solution twice for 2 × 30 min., then reacted with 0.5 M ethanolamine in a 0.1 M NaHCO$_3$ solution for 3 hours. The particles were washed twice with a 0.5 M NaHCO$_3$ solution and then with a 0.1 M NaAc solution for 2 min. and finally with 0.1 M NaAc for 30 min. The particles were suspended in a buffer containing 0.05 M phosphate buffer, pH 4, 0.9% NaCl, 0.3% human serum albumin, 0.05% Tween 20 and 0.01% NaN$_3$ (incubation-buffer).

0.5 ml. of the above suspension, containing 1 mg. particle per 100 μl., was mixed with 50 μl. of an IgE solution containing 400 U (British Research Standard 68/341) IgE per ml., and agitated for 3 hours. The sample was washed with the incubation buffer, and then a solution of 100 μl. of I$^{125}$ anti-IgE was added, containing 3 ng. per 100 μl. The reaction mixture was agitated overnight and the sample washed with 0.9% NaCl and 0.5% Tween 20, and the bound radioactivity was determined using a γ-counter (Table 8).

The results are presented in Table 8. Under "c.p.m." is given the number of counts per min. of I$^{125}$-anti-IgE immunochemically bound to 250 mg. of polyacrylamide polymer conjugate or to 1 mg. of keratin-polymer conjugate.

TABLE 8

| Polymer | Activating agent | C.p.m. |
|---|---|---|
| Polyacrylamide (Enzacryl ®) | Phenylcyanate | 31,000 |
| Keratin | do | 13,000 |

What we claim is:
1. In the method for binding, by covalent bonds,
(a) a water-insoluble polymer containing at least one group of the formula —XH, wherein —XH represents a member selected from the group consisting of hydroxyl groups, primary and secondary amino groups, and
(b) a member selected from the group consisting of water-soluble proteins and water-soluble peptides containing at least one group of the formula —YH, wherein —YH represents a member selected from the group consisting of primary and secondary amino groups, the improvement which comprises
(1) first causing said water-insoluble polymer of
(a) react with an organic cyanate compound in an aqueous alkaline medium,
(2) thereafter reacting the water-insoluble polymer obtained from step (1) with a member selected from the group consisting of water-soluble proteins and water-soluble peptides of the type specified in (b).

2. In the method for binding, by covalent bonds,
(a) a water-insoluble polymer selected from the group consisting of water-insoluble polysaccharides and water-insoluble polysaccharide derivatives containing a member selected from the group consisting of hydroxyl groups and primary and secondary amino groups, and
(b) a member selected from the group consisting of water-soluble proteins and water-soluble peptides containing at least one group of the formula —YH, wherein —YH represents a member selected from the group consisting of primary and secondary amino groups, the improvement which comprises
(1) first causing said water-insoluble polymer of
(a) to react with an organic cyanate compound in an aqueous alkaline medium,
(2) thereafter reacting the water insoluble polymer obtained from step (1) with a member selected from the group consisting of water-soluble proteins and water-soluble peptides of the type specified in (b).

3. The method as set forth in claim 2 wherein said water-insoluble polymer is insoluble but swellable in water.

4. The method as claimed in claim 2 wherein said water-insoluble polymer is a cross-linked three-dimensional hydroxyl group-containing network.

5. The method as claimed in claim 2 wherein the polymer is a copolymer of dextran with epichlorohydrin.

6. The method as set forth in claim 2, wherein the member (b) is an enzyme.

7. The method as set forth in claim 2 wherein the member (b) is an antibody.

8. The method as set forth in claim 2 wherein the member (b) is an antigen.

9. The method of claim 5 wherein member (b) is an enzyme.

10. The method of claim 5 wherein member (b) is an antibody.

11. The method of claim 5 wherein member (b) is an antigen.

12. The method which comprises
(1) reacting together
(a) a water-insoluble polymer selected from the group consisting of cross-linked dextran, agargel of agar-agar, and cellulose, with
(b) an organic cyanate selected from the group consisting of β,β,β-trichloroethylcyanate, 1-adamantylcyanate, phenylcyanate, o-nitrophenylcyanate, p-nitrophenylcyanate, m-chlorophenylcyanate, p-methoxyphenylcyanate, o-tert.butylphenylcyanate, 2,2 - dimethylphenylcyanate, 2,4,6 - tritert.butylphenylcyanate, 2-naphthylcyanate, 1,4-dicyanatebenzene, 2,4-dichlorophenylcyanate, 2-tert.butylphenylcyanate, 2,6-dimethylphenylcyanate, 1-naphthylcyanate, 1,4-phenylendicyanate and 2,2,2-trichloromethylcyanate.
(2) the reaction set forth in (1) being carried out at a temperature of 0–50° C. and in an aqueous alkaline medium having a pH between 7 and 13,
(3) thereafter reacting the reaction product of step (1) with a member selected from the group consisting of water-soluble proteins and water-soluble peptides containing at least one group of the formula —YH, wherein —YH represents a member selected from the group consisting of primary and secondary amino groups, said reaction being carried out at a temperature of 0–50° C. in weakly alkaline solution.

References Cited

UNITED STATES PATENTS 3,645,852   2/1972   Axen et al. _____ 260—112

FOREIGN PATENTS 725,872   6/1969   Belgium.

OTHER REFERENCES

Chem. Abstracts, vol. 55, 1961, 5622e–g, Stark et al.
Chem. Abstracts, vol. 58, 1963, 2587f–g, Stark et al.
Chem. Abstracts, vol. 58, 1963, 3781e–f, Chen et al.
Chem. Abstracts, vol. 60, 1964, 13482e–f, Stark.
Ann. Rev. of Biochemistry, vol. 35, 1966, pp. 873–880, 896–901, Silman et al.
Nature, vol. 214, June 1967, pp. 1302–1304, Axen et al.

HOWARD E. SCHAIN, Primary Examiner

U.S. Cl. X.R.

195—63, 103.5 R, DIG. 11; 260—8, 112 B, 112 R, 112.7, 123.7; 424—1.78